No. 631,839. Patented Aug. 29, 1899.
H. C. WOLTERECK.
PROCESS OF MANUFACTURING WHITE LEAD OR OTHER PIGMENTS BY ELECTROLYSIS.
(Application filed Dec. 16, 1898.)
(No Model.)
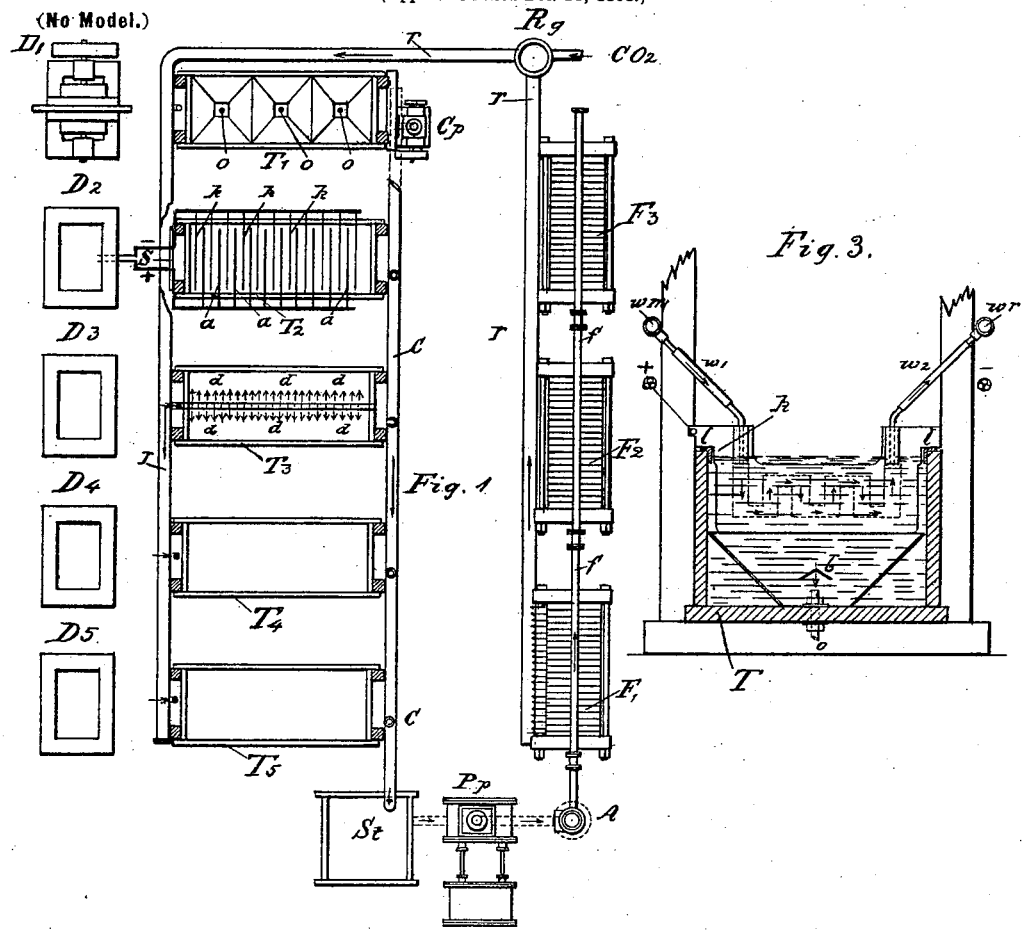
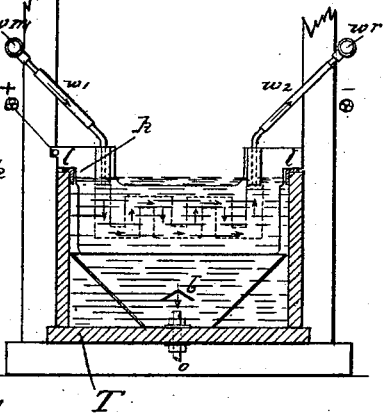
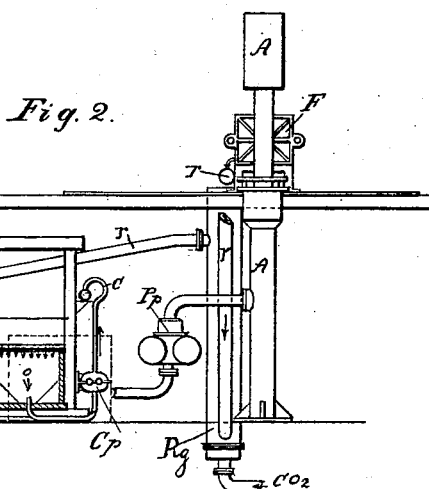
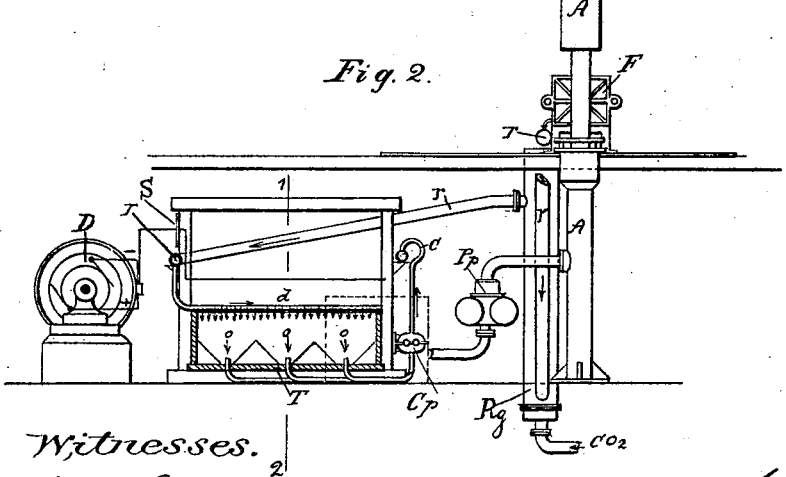

UNITED STATES PATENT OFFICE.

HERMAN C. WOLTERECK, OF NEW YORK, N. Y.

PROCESS OF MANUFACTURING WHITE LEAD OR OTHER PIGMENTS BY ELECTROLYSIS.

SPECIFICATION forming part of Letters Patent No. 631,839, dated August 29, 1899.

Application filed December 16, 1898. Serial No. 699,446. (No specimens.)

*To all whom it may concern:*

Be it known that I, HERMAN C. WOLTERECK, a citizen of the United States, residing at New York, in the county and State of New York, have invented certain new and useful Improvements in Processes of Manufacturing White Lead or other Pigments by Electrolysis, of which the following is a specification.

My invention relates to the manufacture of white lead or other pigments by electrolysis; and it consists in certain novel methods of operation and in the application of certain electrochemical reactions which permit the successful operation of a continuous process.

In United States Letters Patent No. 589,801, granted to me on September 7, 1897, I have fully described a process which will produce white lead by the action of an electric current. To apply this process economically and practically, a great number of experiments had to be made on a manufacturing scale to arrive at a *modus operandi* which while producing a quality of white lead equal if not superior to the best in the market will do so quickly and cheaply. The main conclusions drawn from these experiments are, first, the electrolyte must be kept at as low a temperature as possible; second, the electrolyte must be continuously circulated; third, the carbonic acid must be introduced outside of the sphere of influence of the electric current, and, fourth, the white lead must be removed from the electrolyte continuously and as quickly as formed. These conclusions were based on the following observations:

First. The electrolyte was allowed to reach a temperature above 25° centigrade. The product began to contain more and more crystalline bodies, which reduced the covering capacity and thereby the value of the white lead produced.

Second. The circulation of the electrolyte was insufficient. A number of disturbing secondary reactions took place, which caused a considerable loss of the materials constituting the active parts of the electrolyte and influenced the quality and quantity of the product. For instance, when a solution of a nitrate and a bicarbonate of an alkali was employed as the electrolyte a part of the nitric acid was reduced to nitrous acid. Seventy-five gallons of electrolyte lost fifty per cent. of its nitric acid in five hours by insufficient circulation, while the calculated yield of white lead was greatly reduced. In the case of an acetate being used the acetic acid was reduced and decomposed under the formation of black particles in the product and on the surface of the anodes. These secondary reactions were perfectly stopped by an increased circulation of the electrolyte.

Third. If the carbonic acid was introduced in the electrolyzer direct, samples of white lead taken from the same showed increasing percentages of carbonic acid and in some cases came finally very near to the normal carbonate of lead. It was found that this was caused by a partial decomposition of the white lead formed between the electrodes when coming into contact with an excess of free carbonic acid while under the influence of the electric current.

Fourth. To insure and allow a continuous process, the white lead formed must be continuously removed from the electrolyte before the introduction of the carbonic acid required for the regeneration of the bicarbonate.

These observations were successfully applied to the manufacturing process in the following manner: Cathodes through which cold water is circulated were found to be the best means of keeping the electrolyte at the proper temperature. The electrolyte, with the suspended white lead, is continually removed at the bottom of the electrolyzer and pumped through a set of filter-presses, where the white lead is retained, from where it returns to the electrolyzer after passing through a regenerator in which a current of carbonic-acid gas is passed through it, regenerating the bicarbonate.

The means by which my process is executed on a manufacturing scale are illustrated in the accompanying drawings, in which—

Figure 1 shows a plan of a set of five electrolyzing-tanks complete with pumps and filter-presses; Fig. 2, a cross-section of the same; Fig. 3, a cross-section through a tank and cathode to show the manner of water circulation, not shown in the plan.

Like letters mark like parts in the different figures.

The drawings are made in one-eighth inch per foot, representing a plant which produces three tons of white lead in every twenty-four hours.

D' D² D³ D⁴ D⁵ represent dynamos; T' T² T³ T⁴ T⁵, electrolyzing-tanks, T' showing the subdivision of the bottom in three funnels, as well as the small circulating-pump Cp, which is provided for each tank separately. T² shows the alternate position of ten anodes a and eleven cathodes k, their connection with the dynamo D² and the small switchboard S, which is also provided for each tank separately. T³ shows the arrangement of the branch of the return-pipe r on the top of the tanks which distributes the regenerated electrolyte between the anodes and cathodes by means of the small openings or slits d; C, main circulating-pipe for the electrolyte, which receives a calculated quantity from each tank by means of the small circulating-pumps Cp and conducts the same to the storage-tank St; Pp, high-pressure pump, which forces the electrolyte through the accumulator A into the filter-presses F' F² F³ by means of the feeding-pipe f; r r r, the return-pipe leading from the filter-presses through the regenerator Rg back to the electrolyzing-tanks.

In Fig. 2 o o o show the raised outlet-pipes in the bottom of the tanks. CO² shows a pipe through which carbonic-acid gas is introduced into the regenerator Rg.

Fig. 3 shows the water circulation through the cathodes. (Not shown in the plan in Fig. 1.) wm is the water-main from which the cold water enters all cathodes through the small connection-pipes w'. After passing through the cathode it is allowed to escape through the connecting-pipe w² into the water-discharge main wr. b shows a small protecting-bridge over the outlet o to prevent the small particles of metallic lead which may drop off the anodes mechanically from falling into the circulating system and thus getting mixed with the product.

The working of the system shown is started as follows: After filling the electrolyzing-tanks the pumps are started and enough of the electrolyte is added to maintain a suitable level in the tanks until the return-pipes d begin to run evenly. The dynamos and the carbonic-acid-gas supply are now started and the process proceeds in a regular and smooth manner. The white lead formed between the cathodes and anodes is suspended in the electrolyte owing to its exceeding fineness and is withdrawn continuously by the small circulating-pumps Cp, which deliver the electrolyte through the pipe C into the storage-tank St. From St the large pressure-pump Pp forces the liquid through one of the filter-presses F', F², or F³, on which the accumulator A maintains an even pressure. When the first filter-press is nearly filled, the pressure and the accumulator rise considerably and the liquid is allowed to enter the second filter-press, the first being turned off to be emptied of the white-lead cakes contained in it. If necessary, a current of water may first be passed through it to remove the last traces of electrolyte contained in the compressed white lead. From the filter-presses the electrolyte passes into the bottom of the regenerator Rg, consisting of a high cylindrical vessel, where it meets with a current of carbonic-acid gas, which regenerates the bicarbonate decomposed by the reaction of the process. From the top of the regenerator the electrolyte passes into the return r and is evenly distributed between the anodes and cathodes in the tanks by means of the branches of r and the small openings d.

The reaction in the process proceeds as follows in the case of ammonium nitrate and ammonium bicarbonate being used: In the electrolyte are present $3Pb, 6NH_4.NO_3, 2NH_4.H.CO_3, 6H_2O$ as anode. On the anode are present or formed by the current $3Pb, 6HNO_3$. On the cathode are present, formed by the current, $6NH_4.OH$. In the electrolyte remains unchanged $2NH_4.H.CO_3$. On the anode the $HNO_3$ formed combines with the metallic lead in forming the nitrate of lead, $3Pb(NO_3)_2$. This reacts with the ammonia and the bicarbonate as follows:

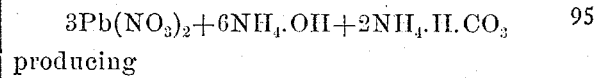

producing

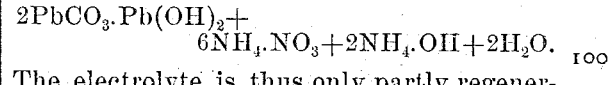

The electrolyte is thus only partly regenerated and the regeneration is only completed after the white lead has been removed by the filter-presses and it enters the regenerator, where the carbonic acid introduced reacts with the free ammonia ($2NH_4 OH$) in producing again the bicarbonate ($NH_4.H.CO_3 2NH_4.OH + 2CO_2$) produce $2NH_4.H.CO_3$.

The proportion of bicarbonate to nitrate necessary for the reaction does not correspond with the molecules required by the reaction, one part bicarbonate to nine to twelve parts of nitrate having been found to give the best results. This is caused by the fact that the bicarbonate is not decomposed by the current and reacts quicker and independently of the rate of progress of the electric anions and cathions. It has been found that this process can be advantageously used for the production of a great number of metallic pigments, in which case the suitable solutions are used in the tanks and the chemicals consumed are added in the regenerator.

In my process zinc white is produced as carbonate of zinc, which is afterward transformed into the oxid by heating. The electrolyte may be a solution of sulfate and bicarbonate of ammonia. When carbon dioxid is introduced into the electrolyzing-vat direct, large quantities of metallic zinc were reduced on the cathodes, rendering the product of a gray color and valueless. Introducing the carbon dioxid into the filtrate a pure white product is obtained. It is to be supposed that the carbon dioxid introduced directly into the electrolyzing-vat does not regenerate the bicarbonate throughout the solution, but only locally, thus allowing free ammonia to form a zincate, which is reduced to metal on the cathode.

In producing copper greens (Scheele's green and mitis green) it was found to obtain even shades in the product, different colorations being clearly marked in the filter-press. This is caused by the acids not being evenly distributed throughout the electrolyte, and the product consequently contains varying quantities of the dark-blue hydroxid of copper, which destroys the brilliancy of the green. On adding the acids (arsenious resp. arsenic acid) to the filtrate products of a perfect shade were obtained. It is to be observed that while in the case of white lead the carbonic acid had to be introduced outside of the electrolyzing-tank to prevent the formation of neutral carbonate and thereby the loss of covering capacity. The regeneration of the electrolyte outside of the electrolyzer is quite as important in the production of other pigments if standard quality is to be the product. This applies to all pigments and is also of the utmost necessity for the production of metallic lakes. Heretofore it has been repeatedly tried to produce lakes by electrolysis; but it has been found impossible to obtain the shades desired, as the solution of color required to combine with the precipitate could never be added or mixed in a sufficiently exact manner with the electrolyte to obtain the desired uniform result. In my process the yield of precipitate per hour is known, and the required quantity of color solution is introduced into the regenerator in a constant and even flow, causing the same to be thoroughly mixed with the electrolyte before entering the electrolyzer.

The advantage of the process as described by me consists in the production of an absolutely uniform product, proceeding automatically and requiring a minimum of labor and attention in its execution.

What I claim as new, and desire to secure by Letters Patent, is—

1. The process of producing white lead, which consists in passing an electric current from a lead anode through an electrolyte capable of dissolving lead and containing an alkali metal bicarbonate, maintaining said electrolyte at a temperature below 25° centigrade, continuously withdrawing the mixed electrolyte and precipitate from the electrolytic vat, removing the white lead therefrom by filtration, introducing carbon dioxid into the filtrate and returning the regenerated electrolyte to the electrolytic vat.

2. The process of producing metallic pigments or lakes which consists in passing an electric current from a suitable anode through an electrolyte capable of dissolving said anode and containing a reagent suitable to produce the desired precipitate, maintaining the electrolyte at the constant temperature required, continuously withdrawing the mixed electrolyte and precipitate from the electrolyzing-vat, removing the precipitate by filtration, introducing the required reagent into the filtrate and returning the regenerated solution to the electrolyzing-vat.

HERMAN C. WOLTERECK.

Witnesses:
WM. BALBACH,
LOUIS PHILIPPE COHEN.